(12) United States Patent
Howald

(10) Patent No.: US 6,360,800 B1
(45) Date of Patent: Mar. 26, 2002

(54) RUNFLAT WHEEL FOR TUBELESS TIRE

(75) Inventor: Gene A. Howald, New Hope, PA (US)

(73) Assignee: Hutchinson SA (FR)

( * ) Notice: Subject to any disclaimer, the term of this patent is extended or adjusted under 35 U.S.C. 154(b) by 0 days.

(21) Appl. No.: 09/586,900

(22) Filed: Jun. 5, 2000

(51) Int. Cl.[7] .......................... B60C 17/02; B60C 5/00; B60C 11/10; B60C 13/26
(52) U.S. Cl. ................... 152/520; 152/158; 301/38.1
(58) Field of Search ................... 152/520, 516, 152/155, 158; 301/38.1, 40.3, 39.1, 8

(56) References Cited

U.S. PATENT DOCUMENTS

| | | | | |
|---|---|---|---|---|
| 1,379,915 A | * | 5/1921 | Guagliardo | 152/158 |
| 2,040,645 A | * | 5/1936 | Dickinson | 152/158 |
| 2,241,858 A | * | 5/1941 | Hruska | 152/158 |
| 2,989,108 A | * | 6/1961 | Gore | 152/158 |
| 3,049,162 A | * | 8/1962 | Rosenbaum et al. | 152/158 |
| 3,394,749 A | * | 7/1968 | Lindley | 152/158 |
| 3,420,288 A | * | 1/1969 | Unruh | 152/158 |
| 3,635,273 A | * | 1/1972 | Patecell | 152/158 |
| RE28,196 E | * | 10/1974 | Patecell | 301/38.1 |
| 4,393,911 A | * | 7/1983 | Winfield | 152/158 |
| 4,572,260 A | * | 2/1986 | Ordu | 152/158 |
| 4,573,509 A | * | 3/1986 | Smith et al. | 152/520 |
| 5,194,104 A | * | 3/1993 | Wada et al. | 152/152 |
| 5,772,805 A | * | 6/1998 | Bobst | 152/158 |
| 6,286,574 B1 | * | 9/2001 | Michelot et al. | 152/520 |

* cited by examiner

*Primary Examiner*—Jason R. Bellinger
(74) *Attorney, Agent, or Firm*—Shlesinger, Fitzsimmons & Shlesinger

(57) ABSTRACT

A circular tire rim has intermediate its ends an annular drop-center section, and coaxially on opposite ends thereof enlarged diameter, circumferential flange sections engageable with the beads of a tubeless tire to support the tire on the rim. Adjacent one end thereof the drop-center section has projecting from its outer peripheral surface a pair of projections angularly spaced 180° from each other about the axis of the rim. Removably secured coaxially on the drop-center section of the rim is an annular runflat device the outer peripheral surface of which normally is radially spaced from the inner peripheral surface of the properly inflated tire on the rim, but engageable by and slidably supporting the inner peripheral surface of the tire when the latter is operated in a runflat mode. The two projections on the drop-center section of the rim seat in registering recesses formed in the inner peripheral surface of the runflat device to prevent any relative movement between the device and the rim.

12 Claims, 1 Drawing Sheet

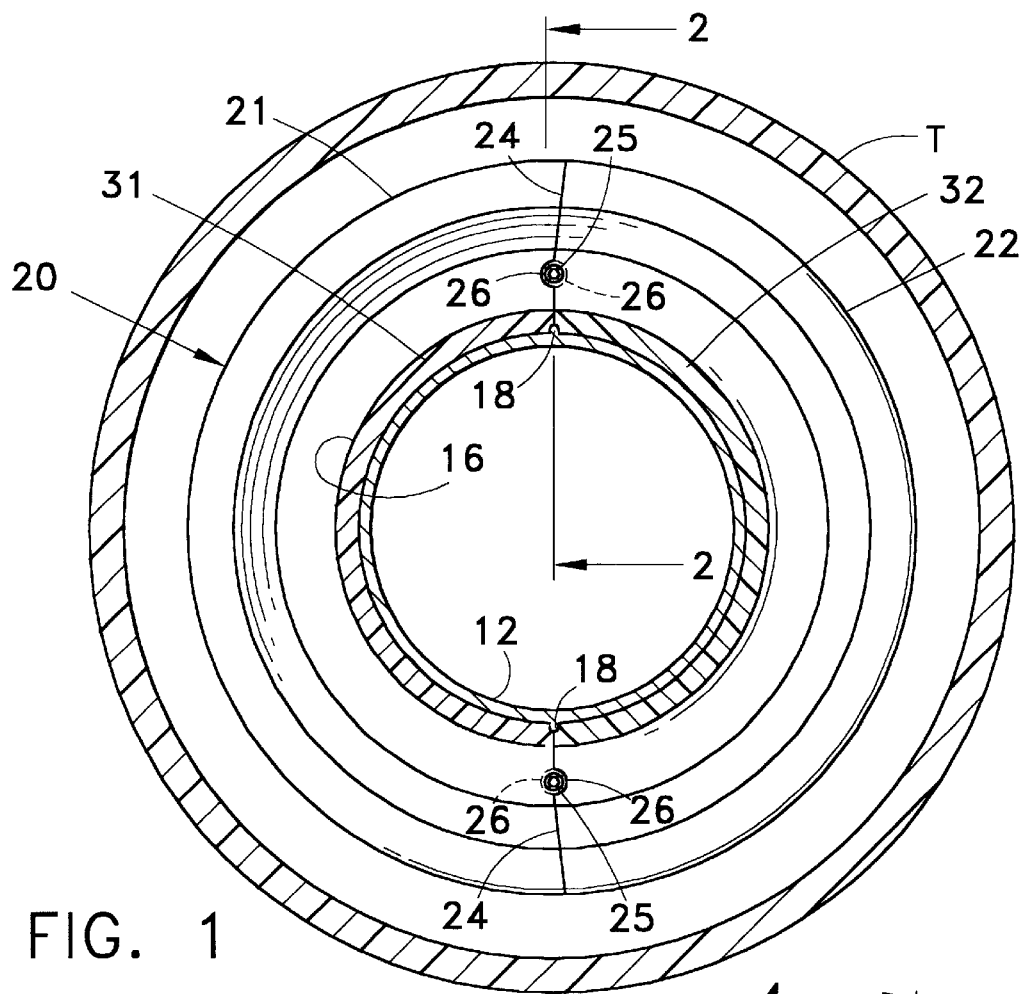
FIG. 1
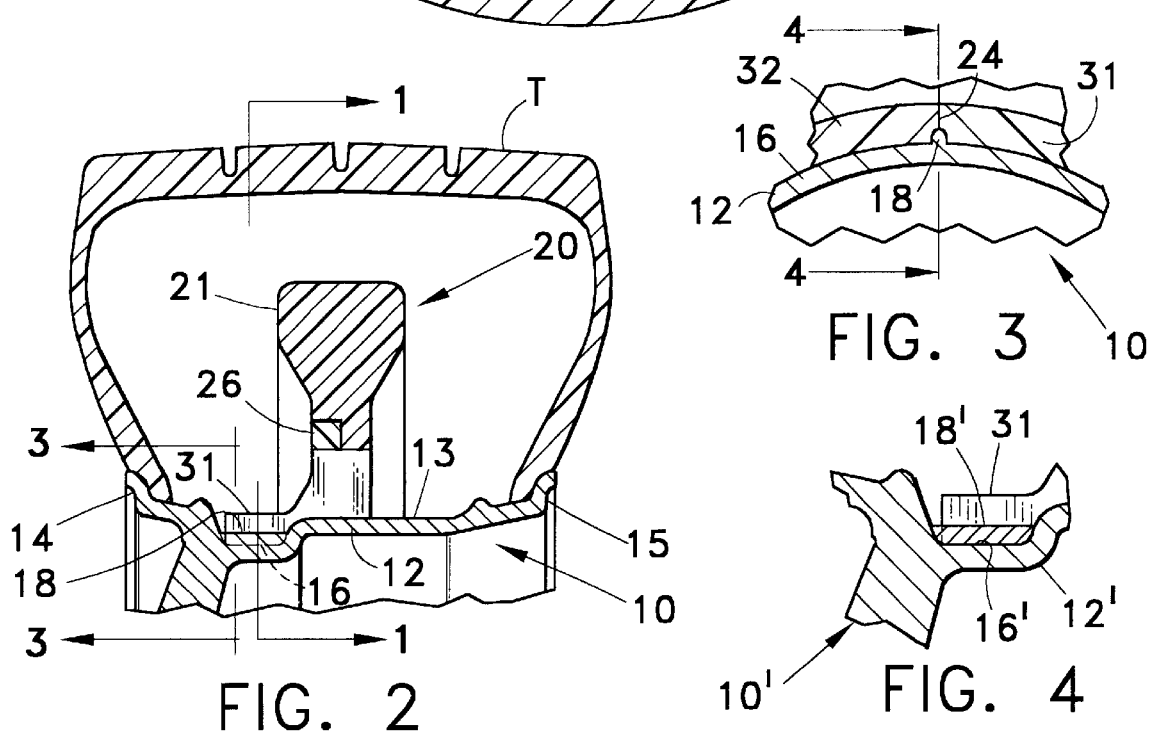
FIG. 2
FIG. 3
FIG. 4

US 6,360,800 B1

RUNFLAT WHEEL FOR TUBELESS TIRE

BACKGROUND OF THE INVENTION

This invention relates to automotive wheels for supporting thereon pneumatic tires, and more particularly to an improved such wheel which enables the wheel to continue to operate safely even after the associated pneumatic tire is no longer inflated, but tends to become flat because of a puncture or the like. More particularly this invention relates to an improved combination of a wheel and associated runflat device which eliminates any undesirable relative motion between the wheel and the runflat device when in use.

Heretofore a number of efforts have been made to provide a satisfactory safety or runflat device for tubeless tires. Unfortunately, in many such devices, as shown for example in U.S. Pat. Nos. 3,049,162, 2,040,645 and 3,635,273, the runflat devices merely comprise annular or ring-shaped devices which are rotatably or moveable mounted on a tire rim for engagement by the inner peripheral surface of a tubeless tire when the latter becomes deflated. Although some such prior devices such as disclosed in U.S. Pat. Nos. 1,379,915 and 3,420,288 proposed to secure the ring-shaped safety device on the tire rim in a snug manner so that the device normally does not rotate relative to the tire rim, nevertheless, such efforts are not very effective in practice, since heavy braking or driving on rough surfaces can cause relative movement between the tire rim and the associated runflat device. This undesirable relative rotation upsets the balancing of the wheel and the tire. In practice, when a runflat device is inserted into a tire and installed upon a wheel, it is customary that an assembly be balanced in a traditional fashion. As long as the runflat device does not move on the wheel, the tire and wheel of the assembly will remain balanced. However, heavy braking or travel on rough bumpy surfaces could cause undesirable relative movement between the wheel and surrounding runflat device, thus causing the formerly balanced wheel to be subjected to undesirable vibration or shimmy which generally is associated with the movement of the runflat device inside the tire.

While efforts have been made to provide runflat devices which are secured against rotation relative to the wheel upon which they are mounted, such as for example as disclosed in U.S. Pat. Nos. 2,241,858, 3,394,749 and 4,573,509, these devices are rather complicated to assemble and difficult to manufacture. Moreover, many such efforts to secure the runflat device against movement on the wheel employ cam locks, bolts, or elastic bands, or the like, which have the disadvantage that each such devices can be installed incorrectly, resulting in the condition that allows the runflat device to move on the wheel, thus leading to the above-noted unbalanced condition of the wheel.

Accordingly, it is an object of this invention to provide a combined wheel and runflat device which permanently eliminates the possibility of the free spinning or movement of the runflat device relative to the wheel, during operation of the associated automotive vehicle.

Still another object of this invention is to provide an improved runflat and wheel product of the type described which are relatively simple and inexpensive to manufacture, and which during assembly cannot be incorrectly installed one relative to the other in any manner which might interfere with the air valve of the associated tire.

More specifically, it is an object of this invention to provide on a wheel of the type described one or more fences which engage the associated runflat device to eliminate any possibility of movement of the runflat during operation of an associated vehicle.

Other objects of the invention will be apparent from the specification and from the recital of the appended claims, particularly when read in conjunction with the accompanying drawings.

SUMMARY OF THE INVENTION

An annular runflat device is formed of two semi-annular sections that are removably secured coaxially upon and surround the annular, drop-center section of a metal tire rim. The outer peripheral surface of the runflat device is disposed normally to be spaced radially inwardly of the inner peripheral surface of a properly inflated tubeless tire mounted on the rim, but is disposed to be engaged with the inner peripheral surface of the tire when the latter is operated in a deflated or run-flat mode. To prevent any relative movement between the runflat device and the rim, the rim has projecting from its outer peripheral surface adjacent one end of its drop-center section a plurality of lugs or fences that are secured to or integral with the rim at angularly spaced points about its axis. The runflat device has integral with and projecting axially beyond one end thereof a circumferential flange the inner peripheral surface of which overlies said plurality of fences, and which has therein a like plurality of recesses in each of which one of said fences is seated to prevent rotational and axial movement of said runflat device relative to said rim.

THE DRAWINGS

FIG. 1 is a sectional view taken generally along the center of an improved automotive wheel and associated runflat device made according to one embodiment of this invention, the view being taken generally along the line 1—1 looking in the direction of the arrows as shown in the hereinafter described FIG. 2 of the drawings, and illustrating the manner in which a pair of fences on the wheel cooperate with the runflat device to prevent any movement thereof relative to the wheel upon which the runflat device is mounted;

FIG. 2 is a fragmentary sectional view taken generally along the line 2—2 in FIG. 1 looking in the of the arrows;

FIG. 3 is a slightly enlarged fragmentary sectional view taken generally along the line 3—3 in FIG. 2 looking in the direction of the arrows; and FIG. 4 is a fragmentary sectional view taken generally along the line 4—4 as shown in FIG. 3 looking in the direction of the arrows and illustrating a modified form of the fences which are employed to prevent relative rotation between the runflat device and the associated wheel upon which it is mounted.

PREFERRED EMBODIMENTS OF THE INVENTION

Referring now to the drawings by numerals of reference, 10 denotes generally a one-piece circular tire rim or wheel which is made of metal, and which has formed centrally thereof an annular drop-center section 12 having an outer peripheral surface 13 for supporting thereon a runflat device as noted hereinafter. Section 12 is integral with and extends between circumferential, tire bead engaging flanges 14 and 15 which are formed coaxially on opposite ends of rim 10 for retaining a tubeless tire T thereon in the usual manner. For a major portion of its axial length, the surface 13 is substantially equally spaced radially from the axis of the circular rim 10. Moreover, adjacent the end thereof which is integral with the rim flange 14, a portion of section 12, and hence its outer peripheral surface 13 curves slightly radially inwardly relative to the axis of rim 10, and thereby effectively forming in that end of section 12 a reduced-diameter annular recess 16, which is adapted to accommodate a portion of the associated runflat device as noted hereinafter.

Integral with section 12, and projecting radially outwardly for at least about ¼ inch from diametrally opposite sides of its annular recess 16 are two integral lugs or fences 18, which extend transversely of the recess 16 and parallel to the axis of rim 10. In cross section the illustrated lugs or fences 18 are substantially semi-cylindrical or inverted U-shaped relative to the surface of the recess 16 beyond which they project.

Removably mounted upon the drop-center section 12 of rim 10 with the inner surface thereof seated coaxially upon the surface 13 is an annular runflat device denoted generally by the numeral 20. Device 20 comprises two semi-circularly shaped runflat sections 21 and 22 having planar surfaces on opposite ends thereof releasably secured along lines 24 (FIG. 1) in abutting, coplanar relation by a pair of bolts 25. The shank of each bolt 25 passes through a pair of registering, semi-cylindrically shaped lugs or bosses 26, one of which projects from the plane end surface on section 21 adjacent one side thereof, and the other of which projects from the registering plane end surface of the other runflat section 22 adjacent the opposite side thereof. The two lugs 26 projecting from opposite ends of section 21 seat in registering arcuate recesses formed in the confronting ends of section 22, and vice versa.

Each of the runflat sections 21 and 22 has integral therewith, and projecting slightly axially beyond one side thereof (the left side as shown in FIG. 2) a semi-annular or semi-circular flange denoted by the numerals 31 and 32, respectively. Flanges 31 and 32 overlie and extend into the annular recess 16 in the rim 10, and have in opposite ends of their inner peripheral surfaces axially extending arcuate recesses disposed to engage opposite sides respectively of the fences 18 when the runflat device 20 has been secured on the rim 10, so that the remaining end surfaces of the flanges 31 and 32 can be disposed in coplanar, butting relation along the line 24.

When the runflat device 20 is mounted on the rim 10 within the tire T, as disclosed above, the runflat sections 21 and 22 are prevented from moving relative to the rim 10 either rotatably or axially relative thereto, by virtue of the fact that their flange sections 31 and 32 are seated in the recess 16, and the opposite ends thereof are secured releasably in engagement with opposite sides of the two fences 18. This is a particularly advantageous construction, because it is a relatively simple matter to mount the runflat device 20 on the tire rim without the need for employing any special tools, apart from the tools necessary to secure the two runflat sections 21 and 22 together by the bolts 25. Device 20 is mounted by placing one bead of a tire on rim 10, then inserting sections 21 and 22 in the tire and securing them coaxially on the drop-center 12 before mounting the remaining tire bead on the rim. With this construction also there is no likelihood that the runflat device 20 will be incorrectly mounted on the rim 10, since the cooperation between the lugs 26 and the registering recesses in the end faces of the sections 21 and 22, as well as the arcuate recesses formed in the inner peripheral surface of the flange sections 31 and 32 will permit the device 20 to be mounted on the rim 10 only in one particular manner.

As for the rim itself, it may of course be a cast aluminum wheel, or the like, in which case the fences 18, as shown in FIGS. 1 to 3, would be simultaneously cast as an integral part of the rim 10. However, the wheel rim 10 could be made of other materials, if desired, such as for example steel. As shown in FIG. 4, a rim 10' made from steel would also be provided with the annular recess 16' adjacent one side of the drop center 12' and the associated fences 18' would be welded to surface 16' for engagement at opposite sides thereof by the flanges 31 and 32 of the runflat sections 21 and 22.

As for the sections 21 and 22, in practice they could be made from a variety of different materials, such as for example the synthetic materials sold under the trademarks Nyram or Hytrel, or alternatively from rubber or aluminum.

In any case, the circular runflat device 20 is designed so that whenever the tire T becomes deflated or reaches a run-flat mode, the inner peripheral surface of the tire will be designed to rotate relative to the outer peripheral surface of the device 20.

From the foregoing it will be apparent that the present invention provides a relatively simple and inexpensive means of providing a runflat device which can be readily mounted on a tire rim or wheel without any need for any special equipment. In use the device is secured against any movement relative to the rim upon which it is mounted by virtue of the integral, circumferential flange sections of the device which seat in the recess 16 in the tire rim 10 and are engaged with opposite sides of the spaced fences which are integral with or otherwise secured to the tire rim at angularly spaced points about its axis. While in illustrated the embodiment only two such fences are employed at 180° intervals about the axis of the rim 10, it will be apparent to one skilled in the art that the number and angular spacing of the fences could be modified without departing from this invention, as can the particular means for securing together the two sections 21 and 22 of the device 20. Also, of course, the annular runflat device 20 could be produced from a greater number of arcuate sections than the two denoted by numerals 21 and 22.

Since the fences or projections are fixed in some manner to the tire rim itself, the runflat device can be mounted in only one position on the rim, therefore preventing any undesirable interference with the tire's air valve, and of course preventing any undesirable "out of balance" conditions during use.

Moreover, while this invention has been illustrated and described in detail in connection with only certain embodiments thereof, it will be apparent that this application is intended to cover any such modifications as may fall within the scope of one skilled in the art, or the appended claims.

What is claimed is:

1. A runflat wheel for tubeless tires, comprising a circular tire rim having coaxially thereof, and intermediate opposite ends thereof an annular drop-center section, a pair of circumferential flange sections integral with and projecting radially outwardly beyond opposite ends, respectively, of said drop-center section for engagement with the circular beads of a tire mounted on said rim, an annular runflat device having therethrough an axial bore removably secured coaxially on said drop-center section of said rim, and having an outer peripheral surface thereof disposed normally to be spaced from a properly inflated tire on said rim, and to be engaged by an inner peripheral surface of the tire when the tire is operated in a deflated mode, said device including an annular flange integral therewith adjacent to and projecting coaxially beyond one end of said axial bore thereof, and coaxially over an annular portion of said drop-center section adjacent one end thereof, said annular flange having in an inner peripheral surface thereof a plurality of recesses angularly spaced from each other about the axial centerline of said flange, and a plurality of axially extending projections integral with respect to and projecting radially from said annular portion of said drop-center section at angularly spaced points about its axis and into said recesses in said flange to secure said device against any movement relative to said tire rim.

2. A runflat wheel as defined in claim 1, wherein said runflat device comprises, a pair of like, semi-annular shaped sections, and means releasably securing said pair of sections together coaxially on said drop-center section with planar surfaces on opposite ends, respectively, of one of said pair of sections engaged in abutting, registering relation with planar surfaces on the opposite ends, respectively, of the other of said pair of sections.

3. A runflat wheel as defined in claim 2, wherein each of said planar surfaces of each pair of said abutting end surfaces has thereon a projection removably seated in a correspondingly shaped recess formed in the registering planar surface with which it is engaged.

4. A runflat wheel as defined in claim 1, wherein said runflat device is made of a generally rigid material having an outer peripheral surface disposed to be slidably engaged by an inner peripheral surface of a tire operated in a deflated mode on said rim.

5. A runflat wheel as defined in claim 3, wherein said annular portion of said drop-center section has thereon two of said projections angularly spaced 180° from each other about the axis of said annular portion, and said recesses in said annular flange are equal in number to said projections and are angularly spaced 180° from each other.

6. A runflat wheel as defined in claim 5, wherein each of said recesses in said annular flange registers with and extends part way into the abutting planar surfaces of a respective pair thereof.

7. A runflat wheel for tubeless tires, comprising a one-piece circular tire rim having intermediate its ends an annular drop-center section and having on opposite ends thereof, respectively, a pair of circumferential flange sections engagable with the circular beads of a tubeless tire mounted on said rim, an annular runflat device having therethrough an axial bore removably secured coaxially on said drop-center section of said rim with an outer peripheral surface of said device disposed to be radially spaced from an inner peripheral surface of a properly inflated tire on said rim, said device having in an inner peripheral surface thereof a plurality of recesses extending axially and part way inwardly from one end of said bore, and being angularly spaced from each other about the axial centerline of said bore, and said drop-center section having fixed to an outer peripheral surface thereof and adjacent one end thereof a plurality of projections angularly spaced from each other about the axial centerline of said rim and seated removably in said recesses in said inner peripheral surface of said device to prevent any relative movement between said device and said rim, said device comprising two segmental annular shaped sections each of which is semi-annular in configuration and overlies one half of said outer peripheral surface of said drop-center section coaxially thereof, opposite ends of one of said two semi-annular sections of said device being disposed in confronting, abutting relation with the opposite ends of the other of said two sections, and each of said two sections having on each end thereof a projection, each of which projections on one of said two sections is releasably seated in a registering recess formed in the confronting end of the other of said two sections.

8. A runflat wheel as defined in claim 7, wherein said projections are integral with said rim.

9. A runflat wheel as defined in claim 7, wherein said projections are secured to and project from said outer peripheral surface of said drop-center section.

10. A runflat wheel for tubeless tires, comprising a circular tire rim having coaxially thereof, and intermediate opposite ends thereof an annular drop-center section, a pair of circumferential flange sections integral with and projecting radially outwardly beyond opposite ends, respectively, of said drop-center section for engagement with the circular beads of a tire mounted on said rim, an annular runflat device having therethrough an axial bore removably secured coaxially on said drop-center section of said rim, and having an outer peripheral surface thereof disposed normally to be spaced from a properly inflated tire on said rim, and to be engaged by an inner peripheral surface of the tire when the tire is operated in a deflated mode, said device including an annular flange integral therewith adjacent to and projecting coaxially beyond one end of said axial bore thereof, and coaxially over an annular portion of said drop-center section adjacent one end thereof, said annular flange having an inner peripheral surface thereof a plurality of recesses angularly spaced from each other about the axial centerline of said flange, a plurality of axially extending projections fixed with respect to and projecting radially from said annular portion of said drop-center section at angularly spaced points about its axis and into said recesses in said flange to secure said device against any movement relative to said tire rim, said runflat device comprising a pair of like, semi-annular shaped sections, means releasably securing said pair of sections together coaxially on said drop-center section with planar surfaces on opposite ends, respectively, of one of said pair of sections engaged in abutting, registering relation with planar surfaces on the opposite ends, respectively of the other of said pair of sections, and each of said planar surfaces of each pair of said abutting end surfaces having thereon a projection removably seated in a correspondingly shaped recess formed in the registering planar surface with which it is engaged.

11. A runflat wheel as defined in claim 10, wherein said projections are integral with said rim.

12. A runflat wheel as defined in claim 10, wherein said projections are welded to said rim.

* * * * *